(12) United States Patent
Addleman

(10) Patent No.: US 9,760,467 B2
(45) Date of Patent: Sep. 12, 2017

(54) MODELING APPLICATION PERFORMANCE USING EVOLVING FUNCTIONS

(71) Applicant: CA, INC., New York, NY (US)

(72) Inventor: Mark Jacob Addleman, Oakland, CA (US)

(73) Assignee: CA, INC., New York, NY (US)

( * ) Notice: Subject to any disclaimer, the term of this patent is extended or adjusted under 35 U.S.C. 154(b) by 174 days.

(21) Appl. No.: 14/659,529

(22) Filed: Mar. 16, 2015

(65) Prior Publication Data

US 2016/0277257 A1 Sep. 22, 2016

(51) Int. Cl.
*H04L 12/26* (2006.01)
*G06F 11/34* (2006.01)
*G06F 11/36* (2006.01)

(52) U.S. Cl.
CPC ...... *G06F 11/3466* (2013.01); *G06F 11/3447* (2013.01); *G06F 11/3452* (2013.01); *G06F 11/36* (2013.01); *G06F 2201/865* (2013.01); *G06F 2201/87* (2013.01)

(58) Field of Classification Search
CPC .................. H04L 43/0864; H04L 43/0823
USPC ......... 709/223, 224, 228, 236; 714/38.1, 45, 714/47.1
See application file for complete search history.

(56) References Cited

U.S. PATENT DOCUMENTS

| | | | |
|---|---|---|---|
| 6,301,615 B1 * | 10/2001 | Kutcher | G06F 11/3495 707/999.01 |
| 6,801,940 B1 | 10/2004 | Moran | |
| 7,627,671 B1 | 12/2009 | Palma | |
| 7,676,706 B2 | 3/2010 | Addleman | |
| 7,870,431 B2 | 1/2011 | Cirne | |
| 8,090,835 B1 * | 1/2012 | Chaine | H04L 41/145 709/226 |
| 8,261,278 B2 | 9/2012 | Peracha | |
| 8,438,276 B1 | 5/2013 | Haber | |
| 2002/0059003 A1 * | 5/2002 | Ruth | G06F 17/30893 700/19 |
| 2004/0088400 A1 | 5/2004 | Daggett | |
| 2007/0083630 A1 * | 4/2007 | Roth | G06F 11/3688 709/223 |
| 2008/0016412 A1 | 1/2008 | White | |
| 2008/0126413 A1 | 5/2008 | Addleman | |

(Continued)

OTHER PUBLICATIONS

"Automatic Behavioral Model Generation Suite for Mobile Phone System Analysis"—Moore et al, Agilent Technologies, Inc., Oct. 2004 http://citeseerx.ist.psu.edu/viewdoc/download?doi =10.1.1. 197.1688&rep=rep1&type=pdf.*

(Continued)

*Primary Examiner* — Randy Scott
(74) *Attorney, Agent, or Firm* — Vierra Magen Marcus LLP

(57) ABSTRACT

An application performance monitoring system monitors a system having multiple components, automatically calculates a performance metric for the system, and determines a relationship between components of the software system that effect the performance metric. The system is configured to automatically generate a model of behavior of the performance metric using a genetic search process that randomly creates a set of functions and evolves those functions over multiple generations with evolution being skewed by a rule based on the determined relationship between components.

20 Claims, 7 Drawing Sheets

(56) References Cited

U.S. PATENT DOCUMENTS

2008/0195369 A1    8/2008  Duyanovich
2008/0294308 A1*  11/2008  Watson ................ G07C 5/0816
                                                        701/21
2011/0098973 A1    4/2011  Seidman
2011/0276836 A1   11/2011  Kahana
2014/0089493 A1    3/2014  Bauer

OTHER PUBLICATIONS

Supplementary European Search Report dated Apr. 13, 2012, European Patent Application No. EP 08877470.
Krogmann, et al., "Using Genetic Search for Reverse Engineering of Parametric Behavior Models for Performance Prediction," IEEE Transactions on Software Engineering, vol. 36, Issue 6, Nov. 2010.

* cited by examiner

MODELING APPLICATION PERFORMANCE USING EVOLVING FUNCTIONS

BACKGROUND

As the Internet's popularity grows, more businesses are establishing a presence on the Internet. These businesses typically set up web sites that run one or more web applications. One disadvantage of doing business on the Internet is that if the web site goes down, becomes unresponsive or otherwise is not properly serving customers, the business is losing potential sales and/or customers. Similar issues exist with Intranets and Extranets. Thus, there is a need to monitor live web applications and web sites to make sure that they are running properly.

IT management personnel are often given the responsibility of detecting when a computer or software system is performing poorly. These personnel are rarely given guidance as to the definition of "performing poorly," nor do they have much knowledge of the systems under their management. This presents a particular challenge to monitoring these systems effectively.

BRIEF SUMMARY

The technology proposed herein seeks to automatically generate models of performance metrics that identify the key system components that drive performance.

One embodiment includes monitoring a system having multiple components, calculating a performance metric for the system, and identifying a relationship between components of the software system that effect the performance metric. The process further includes generating a model of behavior of the performance metric using a genetic search process that randomly creates a set of functions and evolves those functions over multiple generations with evolution being skewed by a rule based on the determined relationship between components.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
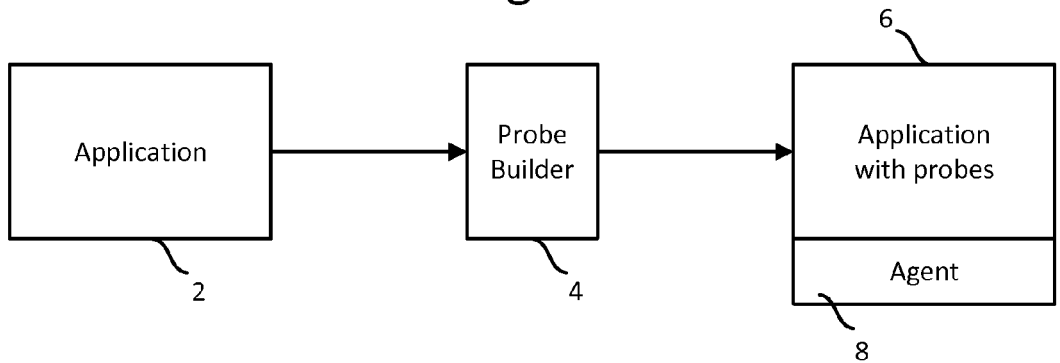
FIG. 1 is a block diagram describing how byte code for an application is instrumented.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Pert, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, processor other programmable data processing apparatus, or other devices to function in a particular manner, such that the instructions when stored in the computer readable medium produce an article of manufacture including instructions which when executed, cause a computer or processor to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

A transaction is a method, process, procedure, function, thread, set of instructions, etc. for performing a task. In one embodiment, technology described herein is used to monitor methods in a Java environment. In that embodiment, a transaction is a method invocation in a running software system that enters the Java Virtual Machine ("JVM") and exits the JVM (and all that it calls). AJVM is one example of machine, virtual or otherwise, that may execute a program. Other examples include LLVM, Python VM, Ruby VM, native processors such as Intel Pentium, i7, etc. In one embodiment, the system described below can initiate transaction tracing on one, some, or all transactions managed by the system. A user, or another entity, can specify a threshold trace period. All transactions whose root level execution time exceeds the threshold trace period are reported. In one embodiment, the reporting will be performed by a Graphical User Interface ("GUI") that lists all transactions exceeding the specified threshold. For each listed transaction, a visualization can be provided that enables the user to immediately understand where time was being spent in the traced transaction. Although the implementation described below is based on a Java application, the technology described herein can be used with other programming languages, paradigms and/or environments.

One example of implementing the proposed technology is within an application performance management tool. One embodiment of such an application performance management tool monitors performance of an application by having access to the source code and modifying that source code. Sometimes, however, the source code is not available. Another type of tool performs application performance management without requiring access to or modification of the application's source code. Rather, the tool instruments the application's object code (also called bytecode). FIG. 1 depicts an exemplar process for modifying an application's bytecode. FIG. 1 shows Application 2, Probe Builder 4, Application 6 and Agent 8. Application 6 includes probes, which will be discussed in more detail below. Application 2 is the Java application before the probes are added. In embodiments that use programming language other than Java, Application 2 can be a different type of application.

In one embodiment, Probe Builder 4 instruments (e.g. modifies) the bytecode for Application 2 to add probes and additional code to Application 2 in order to create Application 6. The probes measure specific pieces of information about the application without changing the application's business logic. Probe Builder 4 also installs Agent 8 on the same machine as Application 6. Once the probes have been installed in the bytecode, the Java application is referred to as a managed application.

Figure 2:
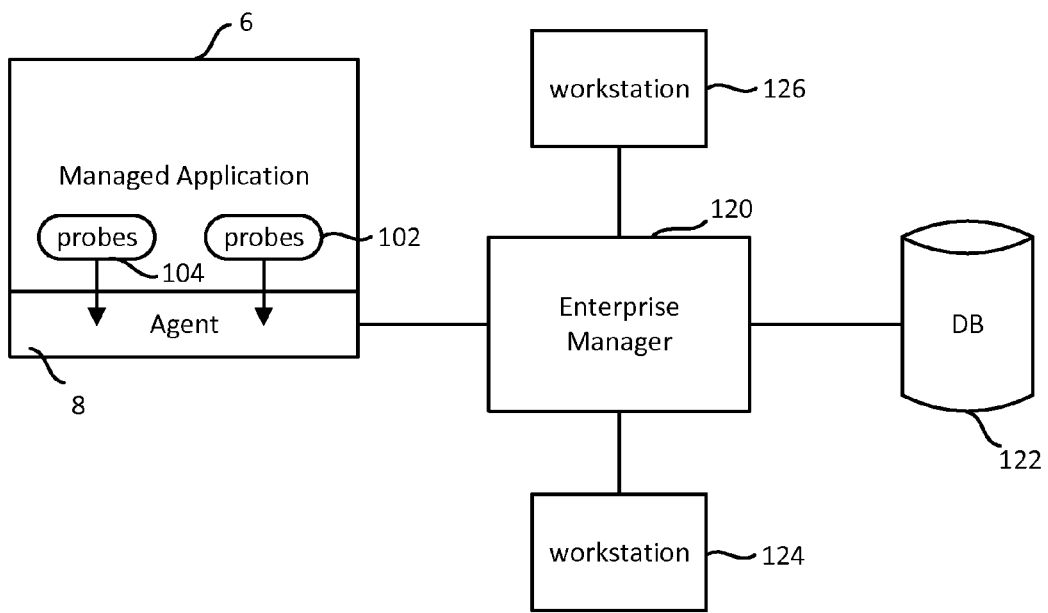
FIG. 2 is a block diagram of a system for monitoring an application.

FIG. 2 is a conceptual view of the components of the application performance management tool. In addition to managed Application 6 with probes 102 and 104, FIG. 2 also depicts Enterprise Manager 120, database 122, workstation 124 and workstation 126. As a managed application runs, probes (e.g. 102 and/or 104) relay data to Agent 8. Agent 8 then collects and summarizes the data, and sends it to Enterprise Manager 120. Enterprise Manager 120 receives performance data from managed applications via Agent 8, runs requested calculations, makes performance data available to workstations (e.g. 124 and 126) and optionally sends performance data to database 122 for later analysis. The workstations (e.g. 124 and 126) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections.

In one embodiment of the system of FIG. 2, each of the components are running on different machines. That is, workstation 126 is on a first computing device, workstation 124 is on a second computing device, Enterprise Manager 120 is on a third computing device, and managed Application 6 is running on a fourth computing device. In another embodiment, two or more (or all) of the components are operating on the same computing device. For example, managed application 6 and Agent 8 may be on a first computing device, Enterprise Manager 120 on a second computing device and a workstation on a third computing device. Alternatively, all of the components of Figure two can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, technology described herein is implemented in software that is stored on one or more processor readable storage devices and is used to program the one or more processors.

The system of FIG. 2 can report information about Key Performance Indicators (KPI), also known as metrics. Examples of KPIs include response time and error rate. Other KPIs can also be reported.

In one embodiment, a user of the system in FIG. 2 can initiate transaction tracing on all or some of the Agents managed by an Enterprise Manager by specifying a threshold trace period in order to report response time. All transactions inside an Agent whose execution time exceeds this threshold level will be traced and reported to the Enterprise Manager 120, which will route the information to the appropriate workstations who have registered interest in the trace information. The workstations will present a GUI that lists all transactions exceeding the threshold. For each listed transaction, a visualization that enables a user to immediately understand where time was being spent in the traced transaction can be provided. In other embodiments, all transactions inside an Agent will be traced and reported to the Enterprise Manager 120, which will route the information to the appropriate workstations and data stores.

Figure 3:
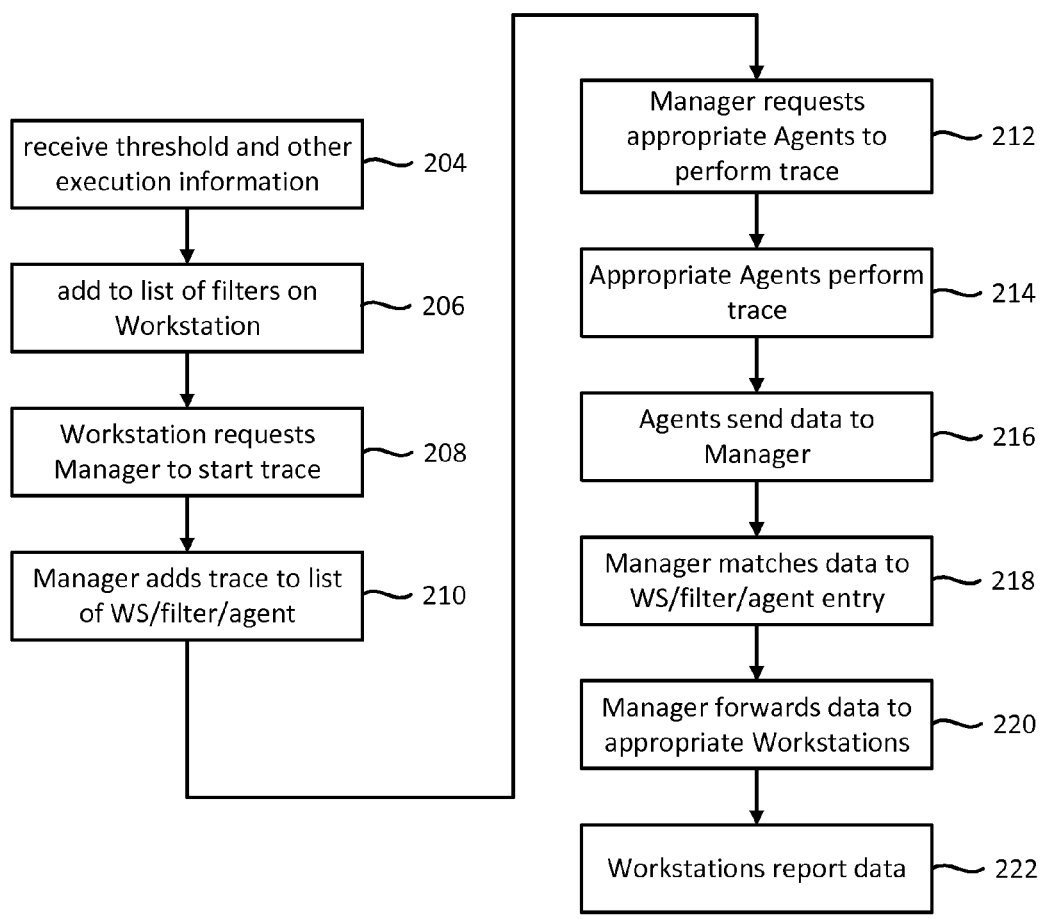
FIG. 3 is a flow chart describing one embodiment of a process for tracing transactions using the system of FIG. 2.

FIG. 3 is a flowchart describing one embodiment of a process for tracing transactions using the system of FIG. 2. In step 204, the various configuration information is received, for example, from an input file or by the user by typing information into a dialogue box. Other means for entering the information can also be used. One variable that can be provided is the threshold trace period. That is, user enters a time, which could be in seconds, milliseconds, microseconds, etc. The system will only report those transactions that have an execution time longer than the threshold period provided. For example, if the threshold is one second, the system will only report transactions that are executing for longer than one second. In some embodiments, step 204 only includes providing a threshold time period. In other embodiments, other configuration data can also be provided. For example, the user can identify an Agent, a set of Agents, or all Agents. In that embodiment, only identified Agents will perform the transaction tracing described herein. In another embodiment, Enterprise Manager 120 will determine which Agents to use. Another configuration variable that can be provided is the session length. The session length indicates how long the system will perform the tracing. For example, if the session length is ten minutes, the system will only trace transactions for ten minutes. At the end of the ten minute period, new transactions that are started will not be traced; however, transactions that have already started during the ten minute period will continue to be traced. In other embodiments, at the end of the session length all tracing will cease regardless of when the transaction started. Other configuration data can also include specifying one or more userIDs, a flag set by an external process or other data of interest to the user. For example, the userID is used to specify that the only transactions initiated by processes associated with a particular one, or more userIDs will be traced. The flag is used so that an external process can set a flag for certain transactions, and only those transactions that have the flag set will be traced. Other parameters can also be used to identify which transactions to trace. The information provided in step 202 is used to create a filter.

In step 206 of FIG. 3, the workstation adds the new filter to a list of filters on the workstation. In step 208, the workstation requests Enterprise Manager 120 to start the trace using the new filter. In step 210, Enterprise Manager 120 adds the filter received from the workstation to a list of filters. For each filter in its list, Enterprise Manager 120 stores an identification of the workstation that requested the filter, the details of the filter (described above), and the Agents the filter applies to. In one embodiment, if the workstation does not specify which Agents the filter applies to, then the filter will apply to all Agents. In step 212, Enterprise Manager 120 requests the appropriate Agents to perform the trace. In step 214, the appropriate Agents perform the trace. In step 216, the Agents performing the trace send data to Enterprise Manager 120. In step 218, Enterprise Manager 120 matches the received data to the appropriate workstation/filter/Agent entry. In step 220, Enterprise Manager 120 forwards the data to the appropriate workstation(s) based on the matching in step 218. In step 222, the appropriate workstations report the data. In one embodiment, the workstation can report the data by writing information to a text file, to a relational database, or other data container. In another embodiment, a workstation can report the data by displaying the data in a GUI.

As noted above, the Agents perform the tracing of the transactions. To perform such tracing, the Agents leverage what is called Blame technology. Blame Technology works in a managed Java Application to enable the identification of component interactions and component resource usage. Blame Technology tracks components that are specified to it. Blame Technology uses the concepts of consumers and resources. Consumers request some activity; resources perform the activity. A component can be both a consumer and a resource, depending on the context. Note that the technology described herein is not limited to Java, and can be applied to other technologies.

When reporting about transactions, the word "Called" designates a resource. This resource is a resource (or a sub-resource) of the parent component, which is the consumer. For example, under the consumer Servlet A (see below), there may be a sub-resource Called EJB. Consumers and resources can be reported in a tree-like manner. Data for a transaction can also be stored according to the tree. For example, if a Servlet (e.g. Servlet A) is a consumer of a network socket (e.g. Socket C) and is also a consumer of an EJB (e.g. EJB B), which is a consumer of a JDBC (e.g. JDBC D), the tree might look something like the following:

```
Servlet A
    Data for Servlet A
        Called EJB B
            Data for EJB B
                Called JDBC D
                    Data for JDBC D
        Called Socket C
            Data for Socket C
```

In one embodiment, the above tree is stored by the Agent in a stack. This stack is called the Blame Stack. When transactions are started, they are pushed onto the stack. When transactions are completed, they are popped off the stack. In one embodiment, each transaction on the stack has the following information stored: type of transaction, a name used by the system for that transaction, a hash map of parameters, a timestamp for when the transaction was pushed onto the stack, and sub-elements. Sub-elements are Blame Stack entries for other components (e.g. methods, process, procedure, function, thread, set of instructions, etc.) that are started from within the transaction of interest. Using the tree as an example above, the Blame Stack entry for Servlet A would have two sub-elements. The first sub-element would be an entry for EJB B and the second sub-element would be an entry for Socket Space C. Even though a sub-element is part of an entry for a particular transaction, the sub-element will also have its own Blame Stack entry. As the tree above notes, EJB B is a sub-element of Servlet A and also has its own entry. The top (or initial) entry (e.g., Servlet A) for a transaction, is called the root component. Each of the entries on the stack is an object. While the embodiment described herein includes the use of Blame technology and a stack, other embodiments can use different types of stack, different types of data structures, or other means for storing information about transactions.

Figure 4:
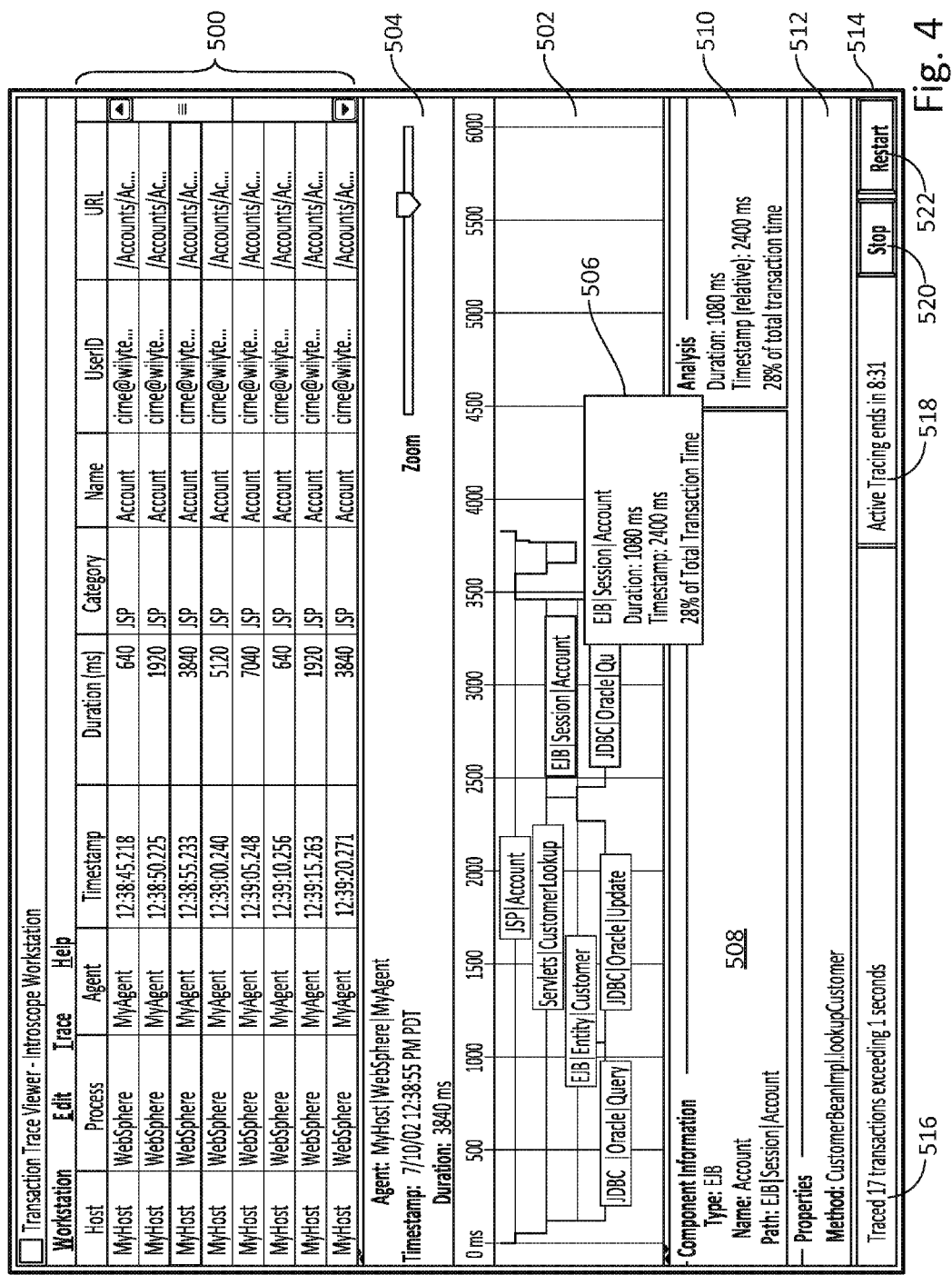
FIG. 4 depicts a graphical user interface.

FIG. 4 provides one example of a graphical user interface to be used for reporting transactions or other KPIs. The GUI includes a transaction trace table 500 which lists all of the transactions that have satisfied the filter (e.g. execution time greater than the threshold). Because the number of rows on the table may be bigger than the allotted space, the transaction trace table 500 can scroll. The table below provides a description of each of the columns of transaction trace table 500.

| Column Header | Value |
| --- | --- |
| Host | Host that the traced Agent is running on |
| Process | Agent Process name |
| Agent | Agent ID |
| TimeStamp (HH:MM:SS.DDD) | TimeStamp (in Agent's JVM's clock) of the initiation of the Trace Instance's root entry point |
| Category | Type of component being invoked at the root level of the Trace Instance. This maps to the first segment of the component's relative blame stack: Examples include Servlets, JSP, EJB, JNDI, JDBC, etc. |
| Name | Name of the component being invoked. This maps to the last segment of the blamed component's metric path. (e.g. for "Servlets|MyServlet", Category would be Servlets, and Name would be MyServlet). |
| URL | If the root level component is a Servlet or JSP, the URL passed to the Servlet/JSP to invoke this Trace Instance. If the application server provides services to see the externally visible URL (which may differ from the converted URL passed to the Servlet/JSP) then the externally visible URL will be used in preference to the "standard" URL that would be seen in any J2EE Servlet or JSP. If the root level component is not a Servlet or JSP, no value is provided. |
| Duration (ms) | Execution time of the root level component in the Transaction Trace data |
| UserID | If the root level component is a Servlet or JSP, and the Agent can successfully detect UserID's in the managed application, the UserID associated with the JSP or Servlet's invocation. If there is no UserID, or the UserID cannot be detected, or the root level component is not a Servlet or JSP, then there will be no value placed in this column. |

Each transaction that has an execution time greater than the threshold time period will appear in the transaction trace table 500. The user can select any of the transactions in the transaction trace table by clicking with the mouse or using a different means for selecting a row. When a transaction is selected, detailed information about that transaction will be displayed in transaction snapshot 502 and snapshot header 504.

Transaction snapshot 502 provides information about which transactions are called and for how long. Transaction snapshot 502 includes views (see the rectangles) for various transactions, which will be discussed below. If the user positions a mouse (or other pointer) over any of the views, mouse-over info box 506 is provided. Mouse-over info box 506 indicates the following information for a component: name/type, duration, timestamp and percentage of the transaction time that the component was executing. Transaction snapshot header 504 includes identification of the Agent providing the selected transaction, the timestamp of when that transaction was initiated, and the duration. Transaction snapshot header 504 also includes a slider to zoom in or zoom out the level of detail of the timing information in transaction snapshot 502. The zooming can be done in real time.

In addition to the transaction snapshot, the GUI will also provide additional information about any of the transactions within the transaction snapshot 502. If the user selects any of the transactions (e.g., by clicking on a view), detailed information about that transaction is provided in regions 508, 510, and 512 of the GUI. Region 508 provides component information, including the type of component, the name the system has given to that component and a path to that component. Region 510 provides analysis of that component, including the duration the component was executing, a timestamp for when that component started relative to the start of the entire transaction, and an indication of the percentage of the transaction time that the component was executing. Region 512 includes indication of any properties. These properties are one or more of the parameters that are stored in the Blame Stack, as discussed above.

The GUI also includes a status bar 514. The status bar includes indication 516 of how many transactions are in the transaction trace table, indication 518 of how much time is left for tracing based on the session length, stop button 520 (discussed above), and restart button 522 (discussed above).

Figure 5:
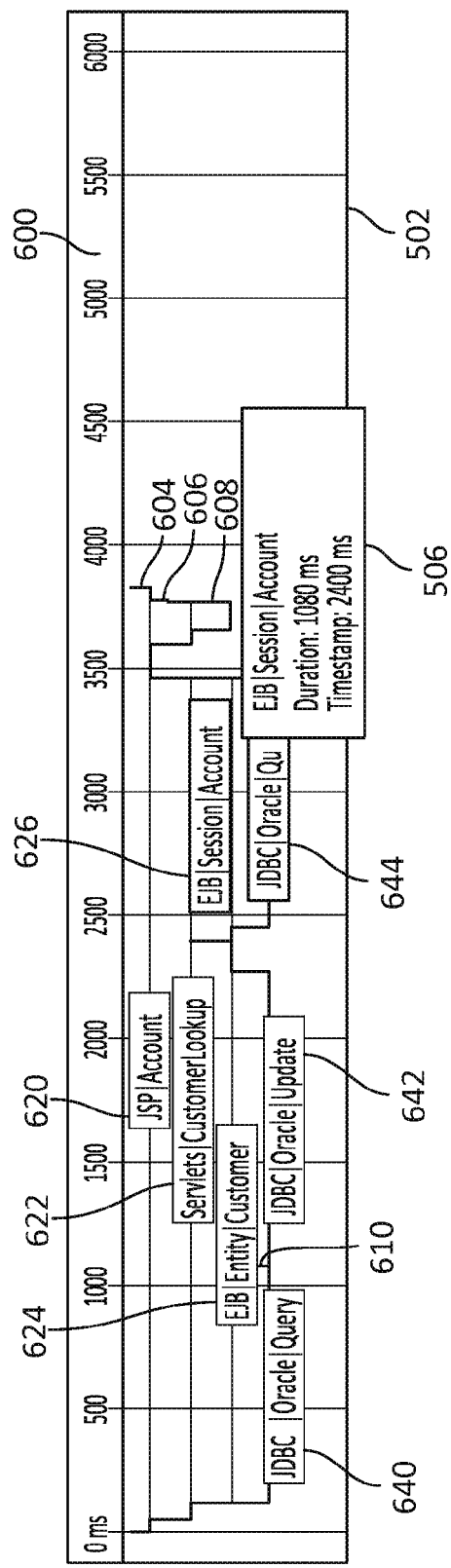
FIG. 5 depicts a portion of the graphical user interface of FIG. 4.

FIG. 5 depicts transaction snapshot 502. Along the top of snapshot 502 is time axis 600. In one embodiment, time axis is in milliseconds. The granularity of the time access is determined by the zoom slider in snapshot header 504. Below the time axis is a graphical display of the various components of a transaction. The visualization includes a set of rows (or levels) 604, 606, 608, and 610 along an axis indicating the call stack position. Each row corresponds to a level of subcomponents. The top row pertains to the root component 620. Within each row is one or more boxes which identify the components. In one embodiment, the identification includes indication of the category (which is the type of component—JSP, EJB, servlets, JDBC, etc.) and a name given to the component by the system. The root level component is identified by box 620 as JSP|Account. In the transaction snapshot, this root level component starts at time zero. The start time for the root level component is the start time for the transaction and the transaction ends when the root level component JSP|Account 620 completes. In the present case, the root level component completes in approximately 3800 milliseconds. Each of the levels below the root level 620 are components called by the previous level. For example, the method identified by JSP/Account may call a servlet called CustomerLookup. Servlet|CustomerLookup is called just after the start of JSP|Account 620 and Servlet|CustomerLookup 622 terminates approximately just less than 3500 milliseconds. Servlets|CustomerLookup 622 calls EJB|Entity|Customer 624 at approximately 200 milliseconds. EJB|entity customer 624 terminates at approximately 2400 milliseconds, at which time Servlet|CustomerLookup 622 calls EJB|Session|Account 626. EJB|session account 626 is started at approximately 2400 milliseconds and terminates at approximately 3400 milliseconds. EJB|Entity-Customer 624 calls JDBC|Oracle|Query 640 at approximately 250 milliseconds. JDBC|Oracle|Query 620 concludes at approximately 1000 milliseconds, at which time EJB|Entity|Customer 624 calls JDBC|Oracle|Update 642 (which itself ends at approximately 2300 milliseconds). EJB/Session/Account 626 calls JDBC|Oracle/Query 644, which terminates at approximately 3400 milliseconds. Thus, snapshot 502 provides a graphical way of displaying which components call which components. Snapshot 502 also shows how long each component was executing for. Thus, if the execution of JSP|Account 620 took too long, the graphical view of snapshot 502 will allow user to see which of the subcomponents is to blame for the long execution of JSP account 620.

The transaction snapshot provides for the visualization of time from left to right and the visualization of the call stack top to bottom. Clicking on any view allows the user to see more details about the selected component. A user can easily see which particular component is causing a transaction to run too slowly. That is, if a transaction is too slow, it is likely that one of the subcomponents is running significantly longer than the other subcomponents. The user can see which subcomponent is running longest and attempt to debug that particular subcomponent.

The above discussion contemplates that the filter used by the Agent to determine whether to report a transaction is based on execution time. In other embodiments, other tests can be used. Examples of other tests include choosing based on UserID, provide a random sample, report any transaction whose execution time varies by a standard deviation, report any transaction that fails or has an error, report any method that has an exception, etc.

The above discussion describes an application performance monitoring system that reports about performance. IT Management personnel, tasked with making sure the system is functioning properly, reviewing the results (e.g., the GUI of FIG. 4) often are given little guidance as to the definition of "functioning properly." Technology is provided herein for baselining performance in order to understand what is means to be functioning properly and to identify when a system is not functioning properly.

The technology described herein is based on a priori definition of KPIs for a particular system and assumes access to a wide array of performance metrics about the system. When a system is behaving normally, its KPIs are correlated to fundamental performance drivers (e.g., user load, available CPU, IO saturation). The performance drivers may be related to one another through universally understood relationships (e.g., CPU is twice as busy when a system is processing 2× the number of transactions). These universally understood, a priori, relationships between fundamental performance drivers are valid under theoretically pure conditions (e.g., no physical or virtual resource limits apply to the computing system). Under most conditions, the relationship between KPIs and the fundamental drivers is unknown but the theoretically perfect relationships between fundamental drivers is known to varying degrees. The proposed technology uses a genetic search algorithm or some other machine learning technique to identify the relationships/correlations between the fundamental drivers and the KPIs. When the relationship/correlation between the drivers and the actual KPI no longer holds, it is likely to be because the system is no longer functioning properly.

Figure 6:
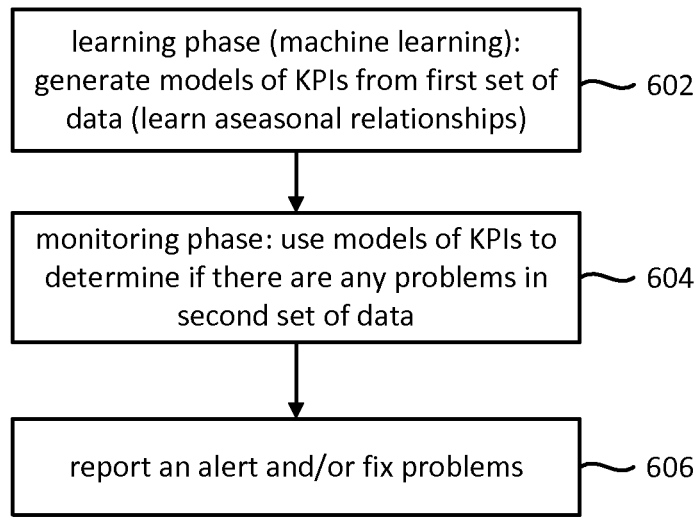
FIG. 6 is a flow chart describing one embodiment of a process for managing application performance.

FIG. 6 is a flow chart describing one embodiment of a process for managing application performance that uses a genetic search algorithm or some other machine learning technique to identify the relationships/correlations between the fundamental drivers and the KPIs, and when the relationship/correlation between the drivers and the actual KPI no longer holds, determines that the system is no longer functioning properly.

The process of FIG. 6 is divided into at least two phases: the learning phase (machine learning) and the monitoring phase. In the learning phase, step 602, the system generates models of KPIs from a first set of data. This is a process of learning aseasonal (not seasonal) relationships/correlations. The first set of data is the data generated by the various agents and communicated to Enterprise Manager 120 according to the process of FIG. 3, and used to generate the graphical user interface of FIG. 4. In one embodiment, the agents will report data for all components, rather than only report for components have data above a threshold. The process of FIG. 6 can be performed by Enterprise Manager 120, any of the Work Stations 124, 126, as well as other computers (having storage systems and processing systems) external to the Enterprise Manager and Work Stations. This learning phase will include the use of a genetic search algorithm (or some other machine learning technique) to identify the relationships/correlations between the fundamental drivers (performance data by various components of the software system generated by the Agents) and the KPIs. More detail about the learning phase (step 602) is described below with respect to FIG. 7. The result of the learning phase is a set of models. In one embodiment, there is one model for each KPI. In another embodiment, some KPIs (or all KPIs), can have more than one model. In some examples, a model is a function that includes a set of linear (or nonlinear) relationships between component data. For example, if the particular KPI in question is a response time for a web application, one possible model is:

$$RT(\text{available\_memory}, \text{available\_database\_connections}) = .45 * \text{available\_memory} + .22 * \text{available\_database\_connections}$$

The monitoring phase, step 604, uses the models/functions of the KPIs to determine if there are any problems based on a second set of data. The first set of data (step 602) corresponds to a first time period and the second set of data corresponds to a second time period. It is possible that the first time period overlaps with the second time period. During the monitoring phase (the second time period), the data from the second time period (second set of data) is fed into the models to predict the KPIs. Additionally, the system will calculate the actual KPIs using the system of FIG. 2. If the actual KPI differs from the predicted, then the system will report an alert in step 606 that the system is not functioning properly. Step 606 can also include fixing the problem. For example, the model may indicate that response time is more sensitive to available memory than available database connections. Then if the system has an unacceptable response time, using the model, the IT professional will know to add more memory to the system.

Figure 7:
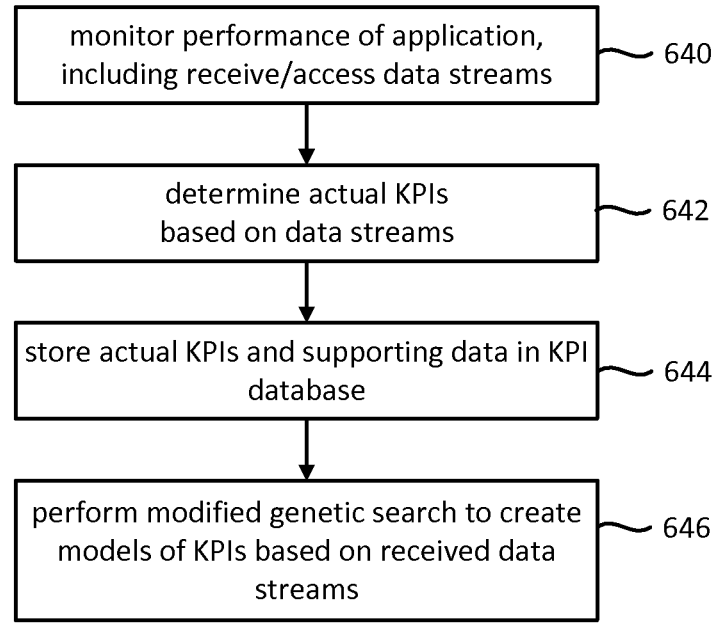
FIG. 7 is a flow chart describing one embodiment of a process for generating models of application performance.

FIG. 7 is a flowchart describing one embodiment of a process for generating the models of the KPIs from the first set of data. The process of FIG. 7 is one example implementation of step 602 of FIG. 6. In step 640 of FIG. 7, the system will monitor the performance of an application (e.g., a software system). Step 640 includes receiving (or accessing) data streams about the performance of the application. For example, step 640 can include performing the process of FIG. 3 using the system of FIG. 2 to generate the data streams that are depicted in the GUI of FIG. 4. As mention above, data can be reported for all transactions or a subset of transactions. Therefore, in one embodiment, the process of FIGS. 6 and 7 are performed by the system of FIG. 2 or by a system external to those components depicted in FIG. 2. Step 640 includes receiving data streams for many component in a system. The components can include objects, methods, functions, EJBs, external components (e.g., database connections, etc.), etc. In step 642, the actual KPIs will be determined based on those data streams. For example if the KPI is response time, the system will find an average response time or mean response time for the particular component or transaction of interest. If the KPI is error rate, then the system will determine the number, average number or mean number of errors for the particular type of transaction for a component. In step 644, the calculated KPIs from step 642 and the data accessed or received in step 640 are stored in a database, herein referred to as the KPI database. For example, the KPI database can be all or a portion of database 122 of FIG. 2. Part of step 644 includes determining the relationships of the call stack so that the GUI of FIG. 5 can be generated and displayed. That information is also stored in the KPI database in step 644. In step 646, the system will perform a modified genetic search to create models of the KPIs based on the received data streams (received in step 640). Step 646 will make use of the data stored in the KPI database. The results of step 646 are a set of models and/or functions, as described above.

Figure 8:
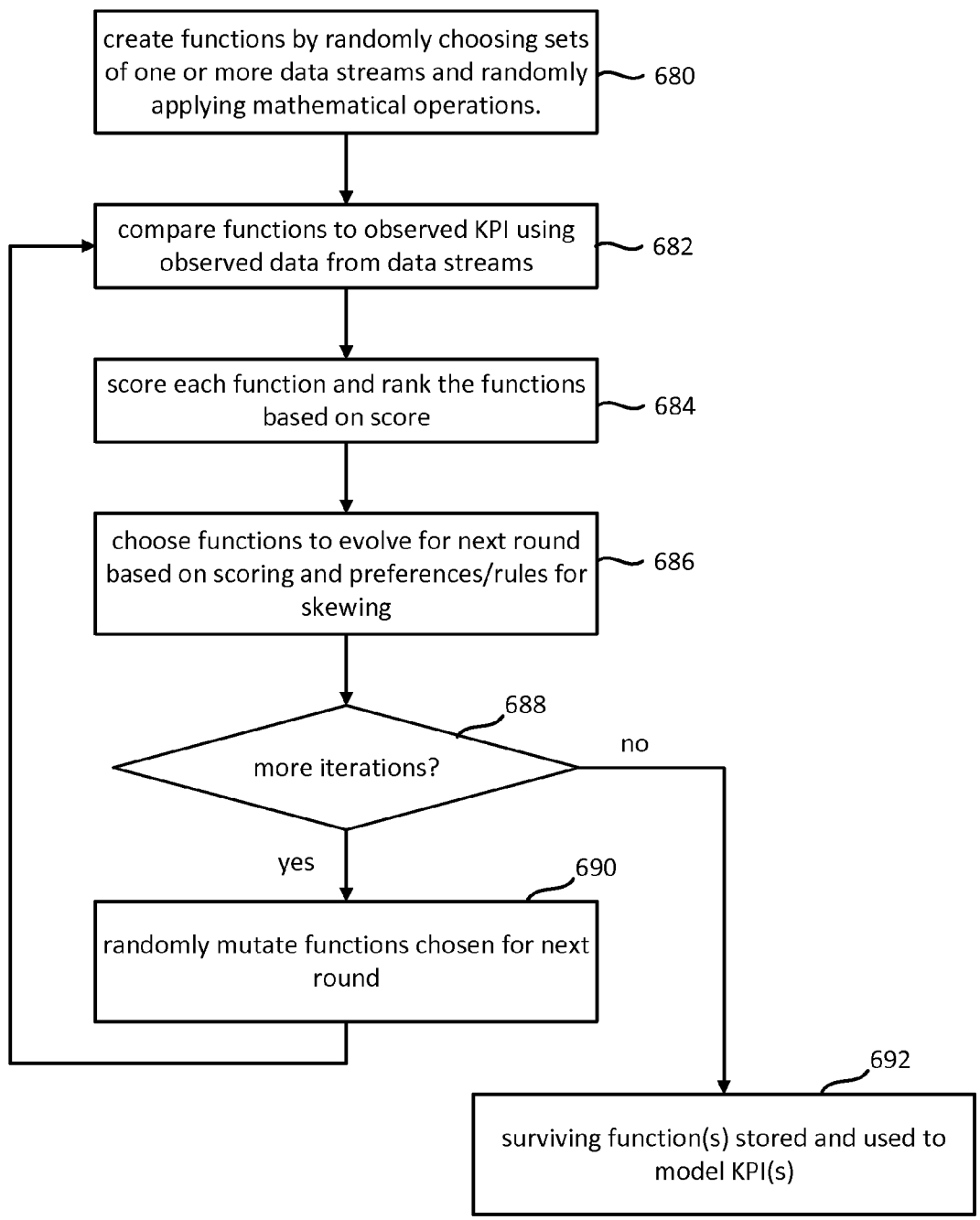
FIG. 8 is a flow chart describing one embodiment of a process for performing a modified genetic search to create models of performance indices based on data streams generated from monitoring performance of an application.

FIG. 8 is a flowchart describing one embodiment of a process for performing a modified genetic search to create models (functions) of performance indices or metrics (KPIs) based on data streams generated from monitoring performance of an application. The process of FIG. 8 is one example implementation of step 646 of FIG. 7. In step 680 of FIG. 8, the system will create functions by randomly choosing sets of one or more data streams (components) representing possible fundamental drivers and randomly applying mathematical operations to these components subject to constraints known from any a priori theoretically pure relationships. In one embodiment, the system will create hundreds or thousands of functions for each KPI. In step 682, the system will compare the functions created in step 680 to the actual observed KPIs. Remember, in step 642 of FIG. 7 the actual KPIs were calculated based on the data streams. In step 682 of FIG. 8, the data streams will be used by plugging the data values into the functions created in step 680 to create results of the functions. Those results of the functions are compared to the actual KPIs. Based on results of step 682, each of the functions will be scored and then ranked based on that score in step 684. In step 686, a subset of functions are chosen to evolve to the next round based on the scoring. In some embodiments, the choosing of functions to evolve based on scoring is skewed based on a set of rules (also known as preferences) as will be discussed below with respect to FIG. 9. The number of iterations (or evolutions) performed by the process of FIG. 8 will be fixed. If the system has already performed the final number of iterations (evolutions), then in step 692 the surviving functions will be stored and used as models for the KPIs. In one embodiment, the system can perform tens, hundreds or thousands of iterations (evolutions).

If (step 688) there are more iterations to perform, then in step 690 the surviving functions chosen to evolve to the next round are randomly mutated. The mutation can involve changing the mathematical operations, adding mathematical operations, adding new components (data streams) and/or combining all or parts of different surviving functions. After step 690, the process loops back to step 682 and the process continues as described above. Over time the functions chosen to evolve to the next round should evolve to have results closer and closer to the observed KPIs (the determined KPIs based on the data streams from step 642 of FIG. 7). Although in some embodiments the number of iterations (evolutions) can be predetermined, in other embodiments, the system can keep performing iterations (evolutions) until the difference between the functions and the actual KPI is less than some threshold.

Figure 9:
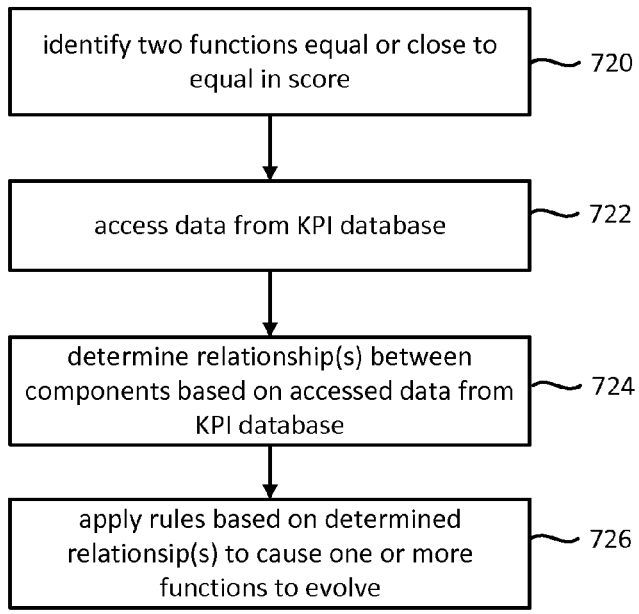
FIG. 9 is a flow chart describing one embodiment of a process for using rules/preferences to skew the choosing of functions to evolve in the modified genetic search to create models of performance indices.

FIG. 9 is a flowchart describing one embodiment of a process for using rules/preferences to skew the choosing of functions to evolve to the next iteration in the modified genetic search to create models of performance indices. That is, the process depicted in FIG. 9 is one example implementation of step 686 of FIG. 8.

In step 720 of FIG. 9, the system will identify two functions that are equal or close to being equal in score. In step 722, the system will access data from the KPI database related to the relationship between components in the functions. Note that the term relationships refers to the relationship in the stack as depicted in GUI 502 of FIG. 4. Those relationships are determined in step 724. That is, the system determines the relationships between all of the components in the two functions identified in step 720. In step 726, one or more rules or preferences are applied based on those determined relationships to cause one or more of those functions to evolve.

The process of FIG. 9 is used to skew the evolution of the functions. In one embodiment, the system can just score the functions and pick the top scores. But the process of FIG. 9 skews the choosing of the functions by not necessarily picking the top scores. There are many examples of rules that can be used. In one example rule, a first function will be chosen over a second function if the first function has components that are deeper in the call stack hierarchy than the first function. The components responsible for the performance metric or index in a function may be in a call stack relationship (as graphically depicted in FIGS. 4 and 5). This call stack relationship includes multiple levels (see FIG. 5). Components on a given level are called by components on a higher level. For example, component 640 in FIG. 5 is called by component 624, with component 624 being on a higher level than component 640. This first example rule is that a function with a component on a lower level should evolve over a function that has components on a higher level. In another alternative, the rule could be that the function with the component on the higher level should evolve over a function with a component on a lower level. Another alternative is that if two functions have components on the same level, both should evolve by combining the two functions (mutating the two functions) into one function.

Some of the components of a software system could include external components such as database connections and users. Another rule that can be used and implemented in step 726 of FIG. 9 is that functions with an external component will evolve over functions without an external component. In other examples, there could be other reasons for making some components a higher priority than other components. Thus, another rule can be that functions with a priority component will evolve over functions without a priority component. Another rule could be that functions with components that have been updated more recently will evolve over functions that have components that have been updated less recently.

As described above, the processes of FIGS. 7, 8, and 9 are used to implement the learning phase, which is step 602 of FIG. 6. The learning phase generates a set of models (the functions that survive the evolutionary process of FIG. 8).

Figure 10:
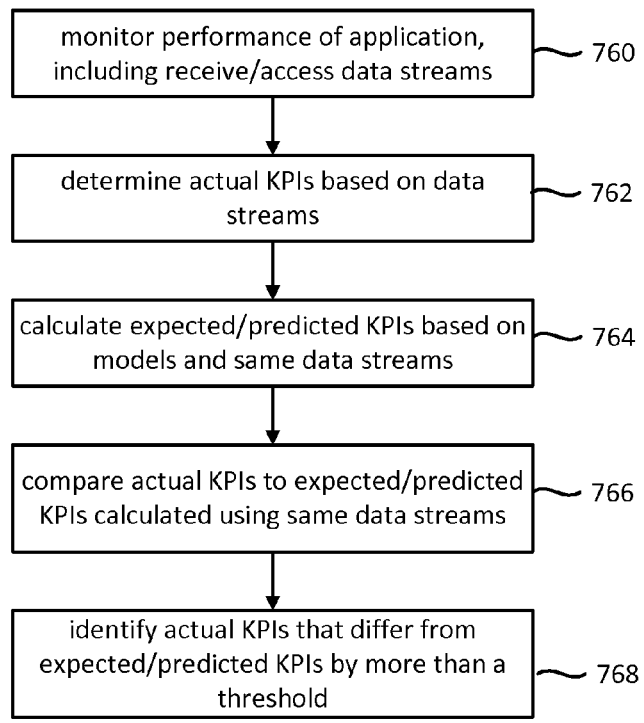
FIG. 10 is a flow chart describing one embodiment of a process for using the models of performance indices to determine if the application is experiencing a problem.

Those models are used in the monitoring phase (step 604 of FIG. 6) to determine if the system is functioning properly. FIG. 10 is a flowchart describing one embodiment of a process of using the models of a learning phase to determine if the application is functioning properly (or otherwise experiencing a problem). The process of FIG. 10 is an example implementation of step 604 of FIG. 6.

In step 760 of FIG. 10, the system will monitor performance of the application (or system), including receiving and/or accessing data streams. Step 760 includes operating the system of FIG. 2 according to the process of FIG. 3 (or similar process) to result in the data depicted graphically in FIG. 4. There will be one data stream for each component being monitored. In step 762, the actual KPIs will be determined based on the data streams. In step 764, the system will predict KPIs based on using the models (functions) and plugging in the data from step 760 until it functions. The results of the functions are the predicted KPIs. Those predicted KPIs are compared to the actual KPIs in step 766. The system will identify any actual KPIs that differ from the predicted KPIs by more than the threshold in step 768. If there are no actual KPIs that differ from the expected or predicted KPIs by more than the threshold, then the system is operating or functioning properly. If there are any actual KPIs differing from the predicted KPIs by more than the threshold, then (looking back at step 606 of FIG. 6), the system will report an alert indicating that the particular KPI and the deviation. The alert can be in the form of an email, text message, window on a monitor, printed report, etc. The alert can be provided to a human operator, software process, or computing machine. The problem identified by the predicted KPI differing from the actual KPI can be remedied manually by the operator or automatically by a software process or computing machine.

When in the learning phase (step 602 of FIG. 6), the models generated will likely be more useful if the data was acquired when the system was functioning properly. In one example implementation, the human operator can verify that from the performance metrics (e.g., the GUI of FIG. 4) that the system was performing properly when the learning phase was performed. In other embodiments, the process of FIGS. 6-9 can be implemented such that certain bad response times can be filtered out or otherwise result in sending an alert to the human operator. In another embodiment, the results of the functions can be bounded by certain predetermined limits such as the a priori constraints known from theoretically pure relationships between fundamental drivers, and if those limits are exceeded then the system will know to ignore the learning phase during that time frame.

One embodiment includes a method for creating a model of a software system, comprising: automatically monitoring performance of a system having multiple components; automatically generating multiple streams of observation data based on the monitoring; automatically calculating a performance metric based on the observation data, each stream of observation data represents observed performance of a component of the system; automatically identifying relationships between at least a subset of the set of components responsible for the performance metric; and performing an automated genetic search process to create a model of the calculated performance metric based on the observation data, the genetic search process includes performing multiple evolutions of functions that result in creation of the model, the multiple evolutions are restrained by a rule based on the determined relationships between the set of components responsible for the performance metric.

In one example implementation, the performing an automated genetic search process to create the model comprises: (a) creating functions by randomly choosing sets of one or more data streams and randomly applying mathematical operations; (b) comparing functions to the calculated performance metric using the observation data; (c) scoring the functions; (d) choosing functions to evolve based on the scoring; (e) randomly mutating functions chosen to evolve; and (f) repeating (b)-(e) multiple times. Wherein the choosing functions to evolve based on the scoring comprises: identifying two functions close in score, the two functions are based on at least two components in the set of components responsible for the performance metric; accessing the determined relationships; and applying the rule based on the determined relationships for the two components. Wherein the set of components responsible for the performance metric have some number of predetermined relationships; the predetermined relationships between components responsible for the performance metrics have varying utility to human understanding; and the rule is that a function whose component data streams yield greater utility to human understanding of the system should evolve rather than a function whose component data streams yield less utility to human understanding.

One embodiment includes an apparatus, comprising: a storage system; and a processing system, the processing system is configured to implement an application performance monitoring system to automatically calculate a performance metric for a software system as well as determine a relationship between components of the software system that effect the performance metric. The processing system is configured to automatically generate a model of behavior of the performance metric using a genetic search process that randomly creates a set of functions and evolves those functions over multiple generations with evolution being skewed by a rule based on the determined relationship between components.

One embodiment includes a computer program product, comprising: a computer readable storage medium having computer readable program code embodied therewith, the computer readable program code comprising: computer readable program code configured to automatically calculate a performance metric for a software system that has multiple components; computer readable program code configured to determine a relationship between a set of components of the software system that effect the performance metric; and computer readable program code configured to generate a model of behavior of the performance metric using a genetic search process that randomly creates a set of functions and evolves those functions over multiple generations with evolution being skewed by a rule based on the determined relationship between the components.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for creating a model of a software system, comprising:
   automatically monitoring performance of a system having multiple components;
   automatically generating multiple streams of observation data based on the monitoring;
   automatically calculating a performance metric based on the observation data, each stream of observation data represents observed performance of a component of the system;
   identifying relationships between at least a subset of components responsible for the performance metric; and
   performing an automated genetic search process to create a model of the calculated performance metric based on the observation data, the genetic search process includes performing multiple evolutions of functions that result in creation of the model, the multiple evolutions are restrained by a rule based on the determined relationships between the set of components responsible for the performance metric;
   wherein the performing the automated genetic search process to create the model comprises:
      (a) creating functions by randomly choosing sets of one or more data streams and randomly applying mathematical operations,
      (b) comparing functions to the calculated performance metric using the observation data,
      (c) scoring the functions,
      (d) choosing functions to evolve based on the scoring,
      (e) randomly mutating functions chosen to evolve, and
      (f) repeating (b)-(e) multiple times.

2. The method of claim 1, wherein the choosing functions to evolve based on the scoring comprises:
   identifying two functions close in score, the two functions are based on at least two components in the set of components responsible for the performance metric;
   accessing the determined relationships; and
   applying the rule based on the determined relationships for the two components.

3. The method of claim 2, wherein:
   the set of components responsible for the performance metric have some number of predetermined relationships;
   the predetermined relationships between components responsible for the performance metrics have varying utility to human understanding; and
   the rule is that a function whose component data streams yield greater utility to human understanding of the system should evolve rather than a function whose component data streams yield less utility to human understanding.

4. The method of claim 2, wherein:
   the set of components responsible for the performance metric are in a call stack relationship comprising multiple levels, components on a level are called by components on a higher level; and
   the rule is that a function with a component on a lower level should evolve rather than a function with a component on a higher level.

5. The method of claim 2, wherein:
   the set of components responsible for the performance metric are in a call stack relationship comprising multiple levels, components on a level are called by components on a higher level; and
   the rule is that a function with a component on a higher level should evolve rather than a function with a component on a lower level.

6. The method of claim 2, wherein:
   the set of components responsible for the performance metric are in a call stack relationship comprising multiple levels, components on a level are called by components on a higher level; and
   the rule is that two functions with components on a same level should both evolve by combing the two functions into one function.

7. The method of claim 2, wherein:
   the rule is that functions with priority components will evolve over functions without the priority components.

8. The method of claim 2, wherein:
   the rule is that functions with an external component will evolve over functions without an external component.

9. The method of claim 1, wherein:
   the performance metric is response time.

10. The method of claim 1, wherein:
    the performance metric is number of errors.

11. An apparatus, comprising:
    a physical computer readable storage medium configured to receive and store observation data based on monitoring performance of a system having multiple components; and
    a processing system in communication with the physical computer readable storage medium, the processing system is configured to implement an application performance monitoring system to automatically calculate a performance metric for the system as well as determine a relationship between components of the system that effect the performance metric, the processing system is configured to automatically generate a model of behavior of the performance metric using a genetic search process that randomly creates a set of functions that include mathematical operations and evolves the functions over multiple generations.

12. The apparatus of claim 11, wherein:
the processing system is configured to perform the genetic search process by randomly choosing sets of one or more data streams and randomly applying mathematical operations, comparing functions to the calculated performance metric using the observation data, scoring the functions, choosing functions to evolve based on the scoring, and randomly mutating functions chosen to evolve.

13. The apparatus of claim 12, wherein:
the processing system is configured to choose functions to evolve by applying the rule based on the determined relationship between components;
the set of components responsible for the performance metric are in a call stack relationship comprising multiple levels, components on a level are called by components on a higher level; and
the rule is that a function with a component on a lower level should evolve rather than a function on a higher level.

14. The apparatus of claim 12, wherein:
the set of components responsible for the performance metric have some number of predetermined relationships;
the predetermined relationships between components responsible for the performance metrics have varying utility to human understanding; and
the rule is that a function yielding greater utility to human understanding of the system should evolve rather than a function yielding less utility to human understanding.

15. The apparatus of claim 12, wherein:
the processing system is configured to choose functions to evolve by applying the rule based on the determined relationship between components;
the set of components responsible for the performance metric are in a call stack relationship comprising multiple levels, components on a level are called by components on a higher level; and
the rule is that two functions with components on a same level should both evolve by combing the two functions into one function.

16. The apparatus of claim 12, wherein:
the processing system is configured to choosing functions to evolve by applying the rule based on the determined relationship between components; and
the rule is that functions with priority components will evolve over functions without the priority components.

17. The apparatus of claim 11, wherein:
the processing system is configured to randomly evolve the functions over multiple generations with evolution being skewed by a rule based on the determined relationship between the components of the system.

18. A computer program product, comprising:
a tangible non-transitory computer readable storage medium having computer readable program code embodied therewith, the computer readable program code comprising:
computer readable program code configured to automatically calculate a performance metric for a system that has multiple components, the performance metric is calculated from first observation data from a first time period for multiple components of the system and subsequently from second observation data from a second time period for multiple components of the system;
computer readable program code configured to identify a relationship between components of the system that effect the performance metric;
computer readable program code configured to use the first observation data to generate a model of behavior of the performance metric using a genetic search process that randomly creates a set of functions and randomly mutates those functions over multiple generations with mutation being skewed by a rule based on the determined relationship between the components; and
computer readable program code configured to monitor multiple components of the system by using the generated model with the second observation data to predict the performance metric and report an alert when the predicted performance metric differs from a calculated performance metric from the second observation data.

19. The computer program product of claim 18, wherein:
the computer readable program code configured to generate a model is configured to automatically perform the genetic search process by randomly choosing sets of one or more data streams and randomly applying mathematical operations, comparing functions to the calculated performance metric using the first observation data, scoring the functions, choosing functions to mutate based on the scoring, and randomly mutating functions chosen to mutate.

20. The computer program product of claim 19, wherein:
the computer readable program code configured to generate a model is configured to choose functions to evolve by applying the rule based on the determined relationship between components;
the set of components responsible for the performance metric are in a call stack relationship comprising multiple levels, components on a level are called by components on a higher level; and
the rule is that a function with a component on a lower level should evolve rather than a function on a higher level.

* * * * *